Patented Aug. 27, 1929.

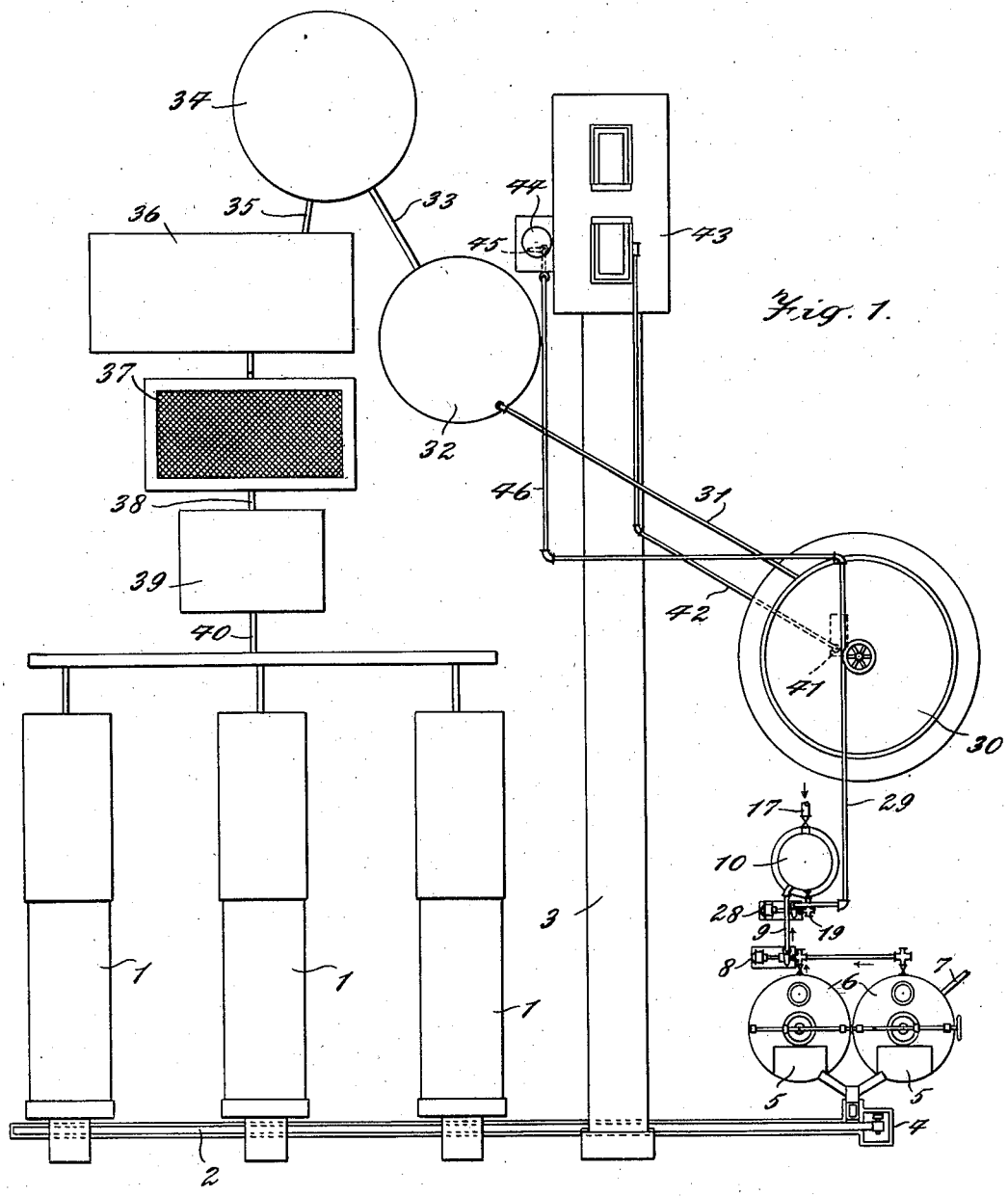

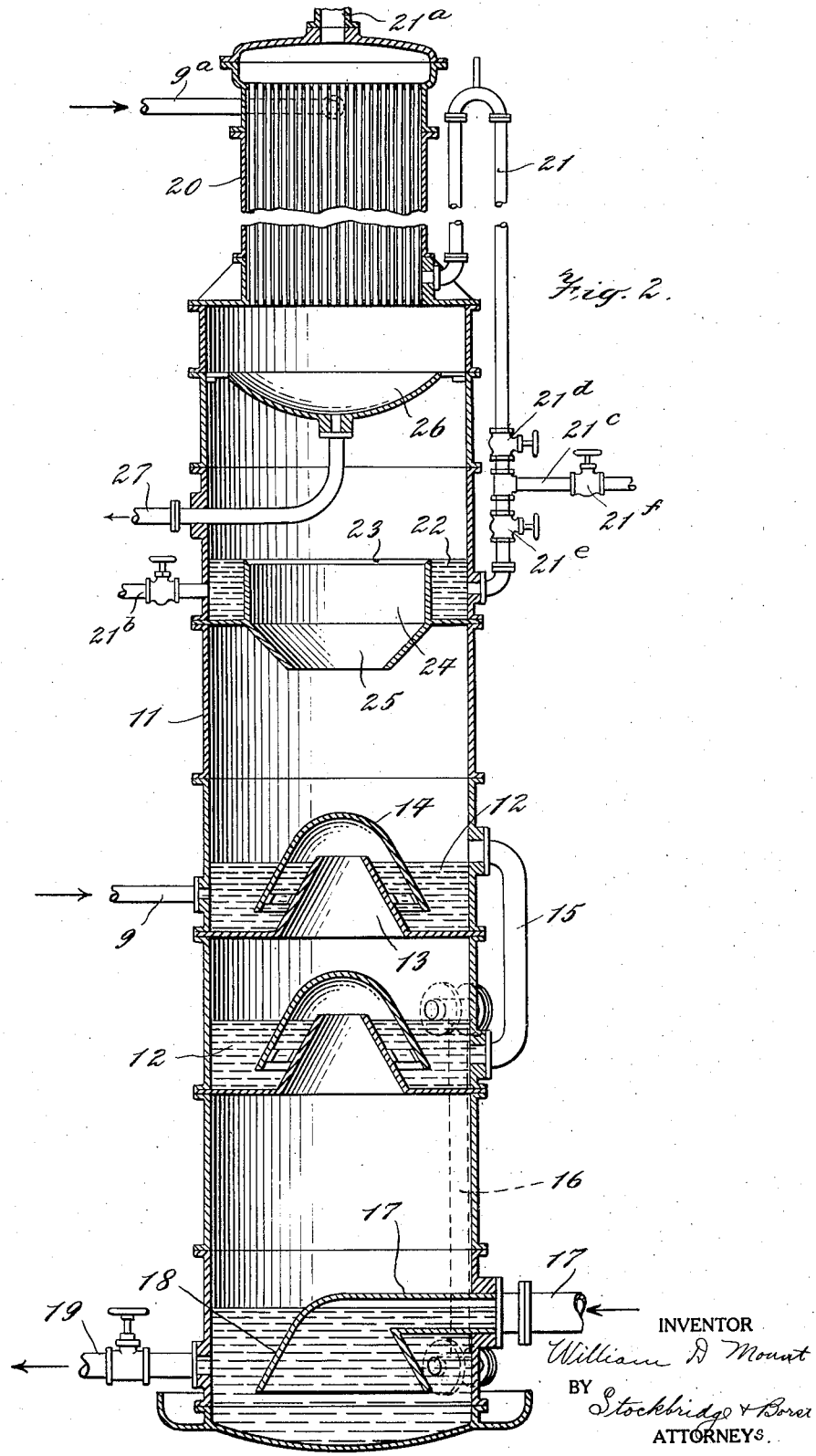

1,725,818

UNITED STATES PATENT OFFICE.

WILLIAM D. MOUNT, OF LYNCHBURG, VIRGINIA.

PROCESS OF PRODUCING WOOD PULP.

Application filed September 10, 1925. Serial No. 55,559.

This invention relates to the wood pulp industry, and particularly to an improved method for use in connection therewith, by means of which lime and alkali may be recovered and by-products largely, if not entirely, eliminated. Heretofore it has been considered essential, and has been the common practice, to leach the black soda ash in special leachers, and to slack the lime in special separate slacking devices. The liquid from the leachers containing the soluble soda compound, and the milk of lime from the lime slackers, were then pumped into the causticizer. It was commonly believed that the leaching must be separately accomplished in order to avoid the carrying of the black ash or carbon particles into the digestor where they would cause a coloration of the pulp. For such prior apparatus considerable floor space was required, there was considerable unavoidable alkali loss in the leachers, and the carbon after leaching was a by-product which offered considerable disposal difficulties.

This invention has for an object to provide an improved process for the wood pulp industry, by means of which the space and apparatus required for the manufacture of pulp is very materially reduced; with which a more perfect alkali recovery may be obtained; with which disposal of the carbon after dissolving of the soda from the black ash is economically accomplished; with which a considerable saving in manual labor of operation is possible; and which operates more efficiently and rapidly than prior apparatus and processes.

A further object is to simplify and improve prior processes employed in this industry, and obtain more efficient and economical operation of the plant, and lower initial installation, and operation costs.

Various other objects and advantages will be apparent from the following description of an application of the invention, and the novel features will be particularly pointed out in connection with the appended claims.

In the accompanying drawing:

Fig. 1 is a diagram illustrating apparatus which may be used for practicing my improved process; and Fig. 2 is a sectional elevation of a continuous causticizer which has been found to be particularly valuable as a part of such apparatus.

In the apparatus diagrammatically illustrated in the drawings and referring particularly to Fig. 1, one or more rotary furnaces or incinerators 1 are arranged to discharge their black soda ash product upon a suitable drag conveyor 2. A continuous lime kiln 3, such as of the rotary type, is similarly arranged to discharge its lime upon the same conveyor 2. The conveyor 2 delivers the deposited ash and lime to a bucket elevator 4, which elevates the lime and ash, and deposits it selectively into either of the slacking baskets 5 of slacking pots 6, to which pots a suitable slacking liquid is admitted by an inlet 7. The ash and lime in the baskets are in contact with the slacking liquid, with the result that the lime will be fully slacked and the sodium content of the ash will be thoroughly dissolved; all in a single operation and in a single container or apparatus. A pump 8 is connected to the pots 6 by suitable pipes, so as to remove the mixture therefrom after dissolving and slacking, and convey it through pipe 9 to a continuous causticizer 10, a particularly valuable form of which is shown on a larger scale and in detail in Fig. 2.

Referring to Fig. 2 the illustrated causticizer comprises a vertical tower or casing 11 having therein a plurality of superposed reaction pans 12, each provided with an upwardly extending flue 13 and a mushroom head 14 extending over the flue and into the liquid of the pan, so that any gases passing upwardly through the flue 13 will be deflected into the contents of the pan by the mushroom head 14. An overflow conduit 15 connects each pan with the next lower pan, so that the pans will be kept substantially filled at all times, and the contents will descend successively from pan to pan. From the lowermost pan 12, the liquid descends by an overflow 16 to the bottom of the casing or tower 11.

A conduit 17 enters the lower part of the casing or tower, and terminates in an inverted bell section 18. The lower part of the casing or tower 11 is also provided with an outlet pipe 19, through which the caustic liquid may be continuously or intermittently removed. Steam or hot air, or a mixture of both, is blown in through the conduit 17, so that it will bubble through, agitate, and heat the liquid collected in the lower part of the tower or casing 11, and then pass upwardly successively through the reaction pans and their contents.

Inasmuch as one hundred percent recovery of the alkali is impossible, some additional alkali solution must be added. For example, soda ash or make-up may be dissolved in a tank until the solution has a certain specified strength or gravity, proper for the causticizing operation. This alkali solution, if fairly cool, may be introduced into the condenser by means of pipe 9ª, from whence it will be delivered to the causticizer proper by means of a pipe 21 which enters a special or overflow pan 22 in the tower or casing 11. If there should be an excess of other liquid for introduction to the causticizer, it may be delivered through the pipe 9ª along with the make-up alkali. The pipe 21 preferably rises to approximately the upper level of the condenser and then descends to the pan 22, so that the cooling section of the condenser will be kept filled at all times. The uncondensed gases passing through the condenser may escape through a vent 21ª.

The special or annular overflow pan 22 is provided with an internal annular wall 24 forming a passage upwardly through the pan and terminating at its upper edge in a circumferential weir edge 23. The wall 24 at its lower end depends from the pan as a converging cone frustum 25 disposed directly above the mushroom head 14 of the uppermost reaction pan. The alkali make-up or other liquid entering the special pan 22 overflows over the weir edge 23 and is deflected by the frusto-conical surface 25 as a continuous double conical sheet upon the mushroom head 14, and thence into the uppermost reaction pan 12. This conical sheet of entering liquid prevents spattering of the reacting chemicals into the upper part of the tower or into the condenser. If the alkaline liquor added to the overflow pan 22 is not cool enough for advantageous use in the condenser 20, it may be added directly to the pan 22 through a pipe 21ᵇ.

The pipe 21 is preferably provided with a branch 21ᶜ, and also with valves 21ᵈ and 21ᵉ on opposite sides of the branch. The branch is also provided with a valve 21ᶠ. With such an arrangement of valves and pipes leading to the causticizer a separate cooling liquid may be introduced into the condenser, whenever desired, such as when the alkali or other liquor to be introduced to the causticizer is too hot to be introduced through the condenser. In the latter case, the alkali or other liquid may be introduced through the pipe 21ᵇ and a separate cooling medium used for the condenser, the valve 21ᵉ being closed and the valves 21ᵈ and 21ᶠ being opened, so that the cooling liquid introduced into the condenser through the pipe 9ª may be withdrawn through branch pipe 21ᶜ. For example, the wash water for the rotary filters, which must be hot, may be first passed through the condenser 20 so as to be preliminarily heated thereby, and thus the heat otherwise lost by the escape of hot gases from the causticizer through the vent will be utilized.

Preferably a drip pan 26 is suspended immediately below the condenser and above the special or overflow pan 22, so as to collect the condensed drip from the gases passing through the condenser and convey it exteriorly of the tower or casing by a suitable pipe 27, thus preventing dilution of the reacting mixture. The drip pan 26 is peripherally spaced from, but may be supported by, the periphery of the tower or casing, so that the gases passing through the causticizer may pass freely around the drip pan and through the condenser. The drip pan and conical sheet of liquid from the pan 22 prevent spattering of the reacting chemicals into the condenser but, if desired, in cases where the added liquor to the pan 22 is insufficient to provide a continuous sheet, a special baffle or mushroom head (not shown) may be interposed in the tower at a suitable point, such as below the drip pan 26, in order to prevent spattering into the condenser of the reacting chemicals.

From the causticizer the caustic liquor and sludge are conducted through the pipe 19, a pump 28, and pipe 29 to a decanter 30. In the decanter the sludge, including the carbon and lime particles, settles to the bottom leaving an exceptionally clear liquid at the top. The clear caustic liquid is removed through a pipe 31 to a suitable storage tank 32.

From the storage tank, the caustic liquor is removed through a pipe 33 to a suitable digestor 34 where wood chips are subjected to the action of the liquor. After the digestor action is complete, the mixture is conducted through a pipe 35 to a pulp storage container or stock tank 36. From the latter the pulp and liquor are separated in any suitable manner such as by a rotary filter and pulp washer device 37, the pulp being washed and utilized in any suitable and usual manner, and the liquor separated from the pulp is conducted by a pipe 38 to a suitable evaporator 39 where it is reduced to a relatively heavy or thick consistency, such as 38° Be'., and then sent by pipe 40 to the rotary black ash furnace 1 where it is burned into an ash and deposited on the drag conveyor 2. The latter conveys it to the slacking and dissolving pots as hereinbefore explained.

The sludge from the decanter is removed by a suitable sludge pump 41 and conveyed through sludge line 42 to a rotary filter or washer device 43 where the solid particles of the sludge are separated from the liquid. The cake from the filter is discharged directly into the rotary lime kiln 3. The liquid separated from the sludge in the filters 43 is collected in a trap 44 and then conveyed by pump 45 and a pipe 46 to the decanter or to the storage tank 32. If desired, it may be conducted directly back to the dissolving pots 6 and used as all or a part of the dissolving liquid. The solid particles of the sludge which are deposited in the rotary kiln contain calcium carbonate and carbon particles.

In the kiln the sludge is calcined, during which operation the carbon content of the sludge is burned, thereby supplying heat to the adjacent particles of calcium carbonate or limestone. This heat in addition to that added causes a reduction of the calcium carbonate or limestone particles to lime, which is deposited upon the conveyor and conducted, preferably while still hot, to the slacking pots 6. Inasmuch as the carbon from the ash is burned in the rotary kiln, its disposal is effectively accomplished without special apparatus, and its heat value is utilized in reducing the limestone particles to lime, thereby effecting an economy in fuel required for the operation of the kiln. It is desirable to supply the reburned lime to the slaker with as little loss of heat as possible, which means that it is in a highly heated condition, preferably at a red heat, as it enters the slaker. This use of the lime enables its heat to be conserved thereby increasing the efficiency of the process and greatly facilitating and expediting the slaking operation. A similar advantage is obtained by the conveying of the black ash to the slaker in a highly heated condition, preferably at a red heat.

In the operation of a plant constructed as shown diagrammatically in the drawings, the black soda ash from the furnaces or incinerators 1 and the lime from the kiln 3 are discharged upon the conveyor 2, conducted thereby to the bucket elevator, elevated and then discharged into either of the slacking pots. In the slacking pots the lime is converted into a hydroxide or milk of lime, and the soluble alkaline portion of the black ash goes into solution leaving the insoluble carbon in suspension. Partial causticization probably also takes place in the slacking pots, the result of the causticizing being the conversion of the lime or milk of lime into calcium carbonate and the formation of sodium hydroxide.

The magma of lime sludge ($CaCO_3$), together with the partially causticized liquor and the insoluble carbon in suspension, is pumped continuously to the causticizer 10 where causticization is completed to a specified and uniform strength. The magma above mentioned is delivered continuously from the causticizer to the decanter 30, where the calcium carbonate and carbon are precipitated continuously, settle to the bottom of the decanter and are delivered in a continuous stream to the continuous filters 43, where the alkaline liquor is separated from the sludge and the latter washed with hot water, the washed sludge falling from the filter into the feed end of the rotary kiln 3, together with all of the carbon contained therein with the calcium carbonate.

In the rotary kiln the carbon is burned giving up whatever heat it may have to assist in the calcination of the lime sludge. The burned lime is discharged by the opposite end of the kiln into the conveyor where it meets the stream of black ash from the incinerators or furnaces 1. The clear liquor from the decanter is conducted either to a storage tank or to the digestors and after being used for the treatment of wood it is separated from the pulp, then evaporated or reduced to a heavy consistency, and discharged into the furnaces or incinerators 1 where it is burned into an ash.

Heretofore, it has been assumed that this cycle of operation was impractical, particularly where the causticization was carried on by the open pan batch method in general use in the soda and sulphate processes. The opinion heretofore has been that the separation of the carbon particles from the caustic liquid was impossible, because the carbon particles would float and were so fine that they would pass through a filter with the liquid into the digestor, where they would color and dilute the pulp. In this improved process, however, it has been found that the carbon will settle in the decanter, giving a perfectly clear liquor at the top, and the recovered lime from the kiln 3 is clean and white without a trace of carbon showing.

The carbon in this process apparently undergoes a change in physical condition or characteristics, it now having the property or tendency to settle in the liquor. It is believed that this change in physical condition or characteristics of the carbon is largely due to its violent agitation in the presence of lime sludge in the reaction pans of the causticizer although possibly the change may begin in the slacker where the red hot ash is continuously dropping along with the red hot lime into a slurry or milk. Apparently the carbon particles are coated with much smaller particles of lime sludge which increases the weight of the carbon sufficiently to prevent its floating. In this connection it should be noted that the construction and mode of operation of applicant's causticizer is such that the mixture of lime and soda ash in small quantities is subjected to the most violent agitation, not obtainable in the use of causticizers of ordinary form as used in this art, in which the material under treatment is in large bulk, usually in an open container.

The process and apparatus of this invention have the following advantages:—

Elimination of all leaching apparatus of whatever character.

Elimination of all labor required to operate present types of leaching plants.

Elimination of all power for pumping and otherwise required under present methods of leaching.

Space now required for leaching apparatus can be either eliminated, or utilized for other purposes.

Elimination of all alkali loss incident to present method of leaching.

Fullest utilization of sensible heat of the black ash as discharged from the incinerator.

Handling and complete disposal of the carbon in the black ash without additional equipment.

Recovery and reuse of the lime.

The supplying of lime to the slaker at a red heat conserves the heat of the lime and greatly expedites slaking.

The supplying of black ash to the slaker at a red heat conserves the heat of the black ash and greatly expedites its dissolving.

Complete recovery of the fuel value of the carbon.

A considerable part of the apparatus employed is that frequently found and used in chemical industries and for that reason is shown only diagrammatically. The continuous causticizer, however, being less common, is shown in greater detail in Fig. 2. It will be understood, however, that various changes in the details of apparatus, and in the steps and details of the process, that have been herein described and illustrated for the purpose of explaining the nature of the invention, may be made by those skilled in the art within the principle and scope of the invention as expressed in the appended claims.

I claim:

1. The cyclic process of producing wood pulp which consists in digesting the pulp material with a caustic soda solution, recovering the soda content of the spent liquor as black ash, introducing into a slaking liquid a supply of lime, dissolving the black ash without fine grinding, whereby the formation of fine particles of carbon is avoided, subjecting a mixture of the slaked lime and black ash solution to continuous hot causticization with agitation of sufficient violence to cause the carbon particles to be exposed to contact with particles of carbonate of lime and to become decantable with substantial completeness along with the carbonate of lime to form a sludge, continuously separating by decantation such sludge, leaving a clear causticized liquor, continuously removing such liquor and adding it to the supply of liquor for digesting wood pulp, and continuously removing said sludge.

2. The cyclic process of producing wood pulp which consists in digesting the pulp material with a caustic soda solution, recovering the soda content of the spent liquor as black ash, introducing into a slaking liquid a supply of lime, dissolving the black ash without fine grinding, to obtain a solution in which the carbon content of the black ash is present in the form of coarse particles, subjecting a mixture of the slaked lime and black ash solution to continuous hot causticization with violent agitation, whereby the carbon particles acquire the property of settling with substantial completeness along with the carbonate of lime to form a sludge, continuously separating by decantation such sludge, leaving a clear causticized liquor, continuously removing such liquor and adding it to the supply of liquor for digesting wood pulp, calcining the sludge to quick lime, and reusing said lime to maintain the cycle of operations.

3. The cyclic process of producing wood pulp which consists in digesting the pulp material with a liquid containing caustic soda, recovering the sodium content of the spent liquor, introducing into a slaking liquid lime in highly heated condition, dissolving the recovered sodium content, subjecting a mixture of the slaked lime and dissolved sodium compound to continuous hot causticization, continuously separating by decantation clear causticized liquor from the lime sludge, adding said clear liquor to the supply of liquor for digesting wood pulp, calcining said sludge to quick lime, and conveying said reburned lime in highly heated condition to the slaking liquid to maintain the cycle of operations.

4. The cyclic process of producing wood pulp which consists in digesting the pulp material with a caustic soda solution, recovering the soda content of the spent liquor as black ash, introducing into a slaking liquid lime in highly heated condition, dissolving the black ash without fine grinding, whereby the formation of fine particles of carbon is avoided, subjecting a mixture of the slaked lime and black ash solution to continuous hot causticization with agitation of sufficient violence to cause the carbon particles to be exposed to contact with particles of carbonate of lime and to become decantable with substantial completeness along with the carbonate of lime to form a sludge, continuously separating by decantation clear causticized liquor from said sludge, adding said clear liquor to the supply of liquor for digesting wood pulp, calcining said sludge to quick lime thereby utilizing the fuel value of the carbon particles, and conveying said lime in highly heated condition to the slaking liquid to maintain the cycle of operations.

5. The cyclic process of producing wood pulp which consists in digesting the pulp material with a caustic soda solution, recovering the soda content of the spent liquor as black ash, introducing into a slaking liquid lime in highly heated condition and black ash without fine grinding whereby the formation of fine particles of carbon is avoided, subjecting the mixture of slaked lime and dissolved black ash to continuous hot causticization with agitation of sufficient violence to cause the carbon particles to be exposed to contact with particles of carbonate of lime and to become decantable with substantial completeness along with the carbonate of lime to form a sludge, continuously separating by cantation clear causticized liquor from said sludge, adding said clear liquor to the supply of liquor for digesting wood pulp, calcining said sludge to quick lime, thereby utilizing the fuel value of the carbon particles, and conveying said lime in highly heated condition to the slaking liquid to maintain the cycle of operations.

In witness whereof, I hereunto subscribe my signature.

WILLIAM D. MOUNT.